Figure 1:
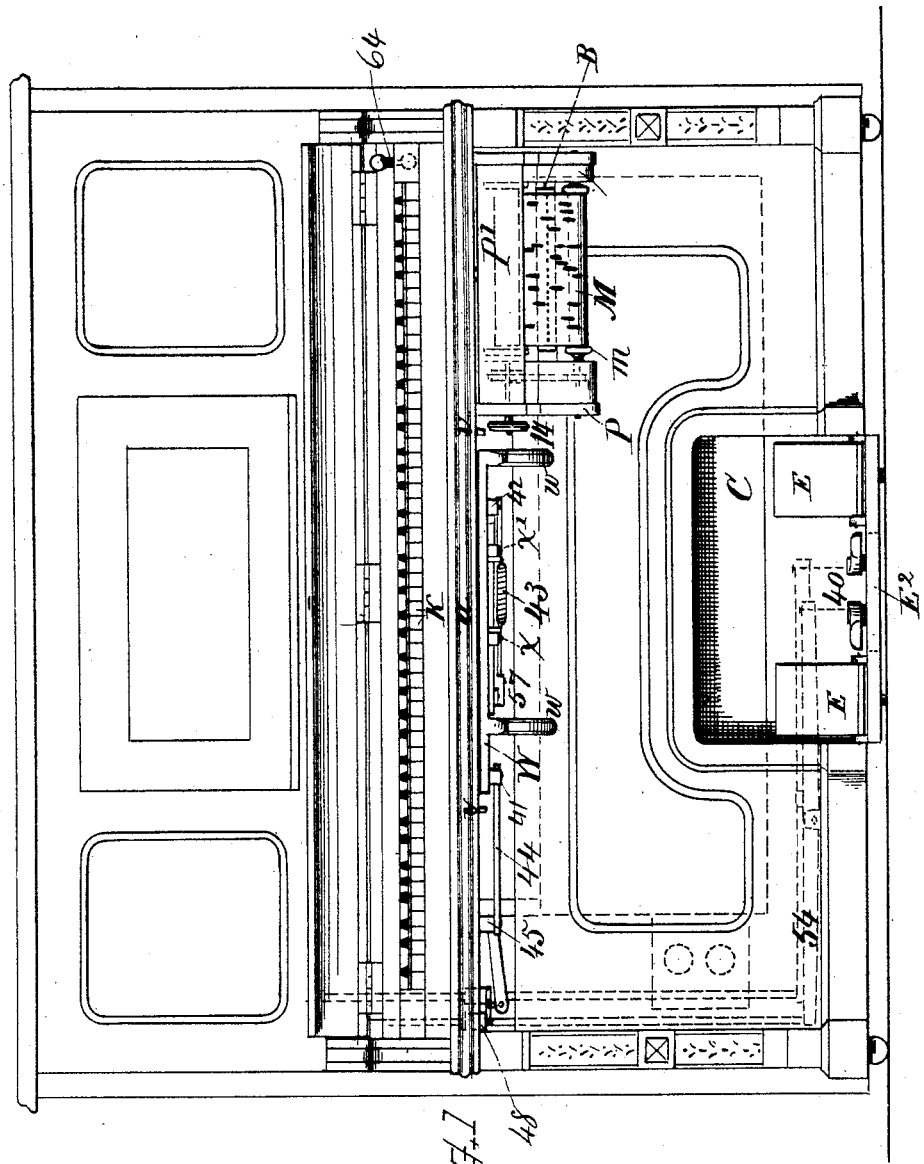

(No Model.) 9 Sheets—Sheet 1.
W. D. PARKER.
AUTOMATIC PIANO.

No. 470,323. Patented Mar. 8, 1892.

Witnesses
Ella P. Blenus
Simeon E. King

Inventor
William D. Parker
By Chas. H. Burleigh
Attorney

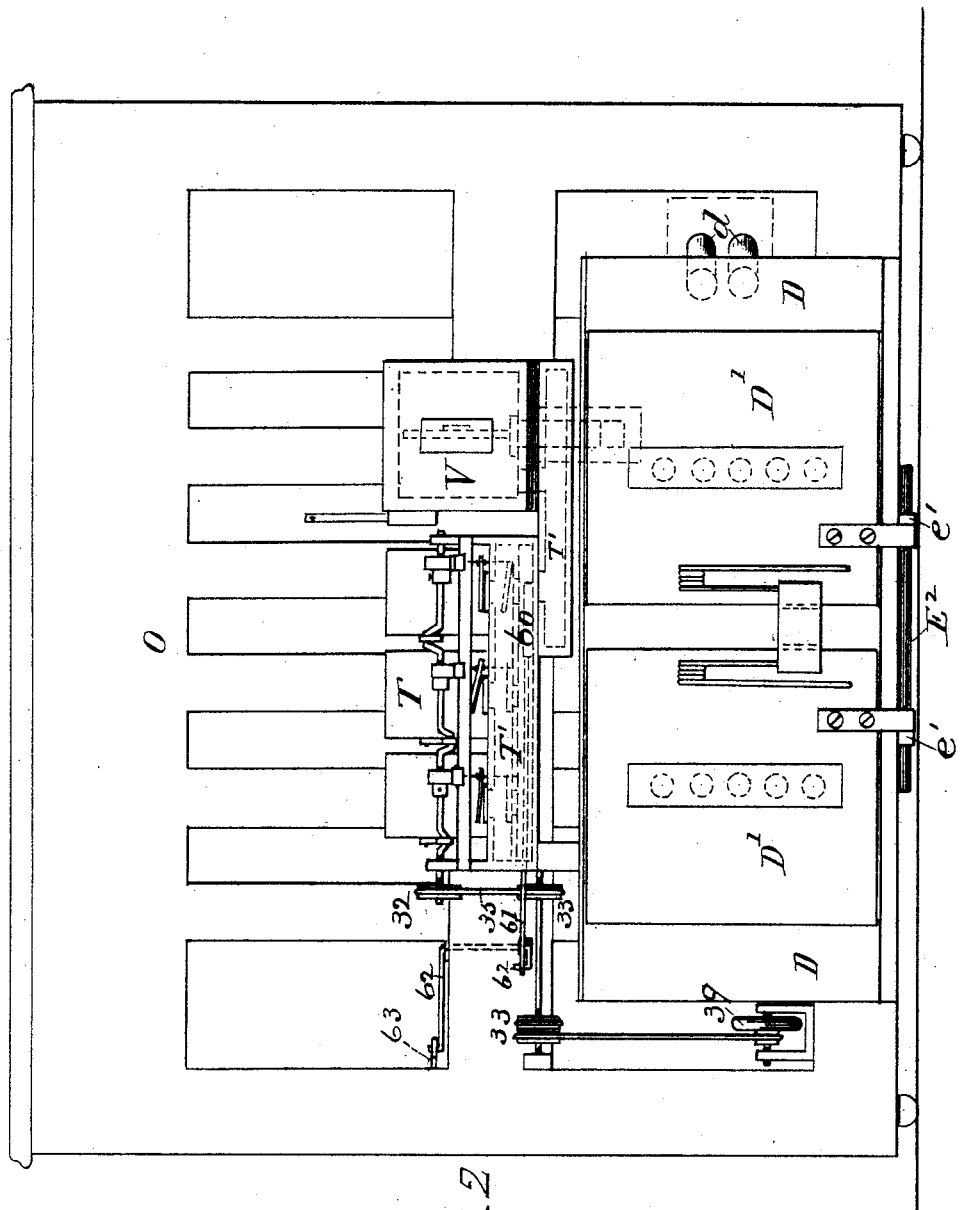

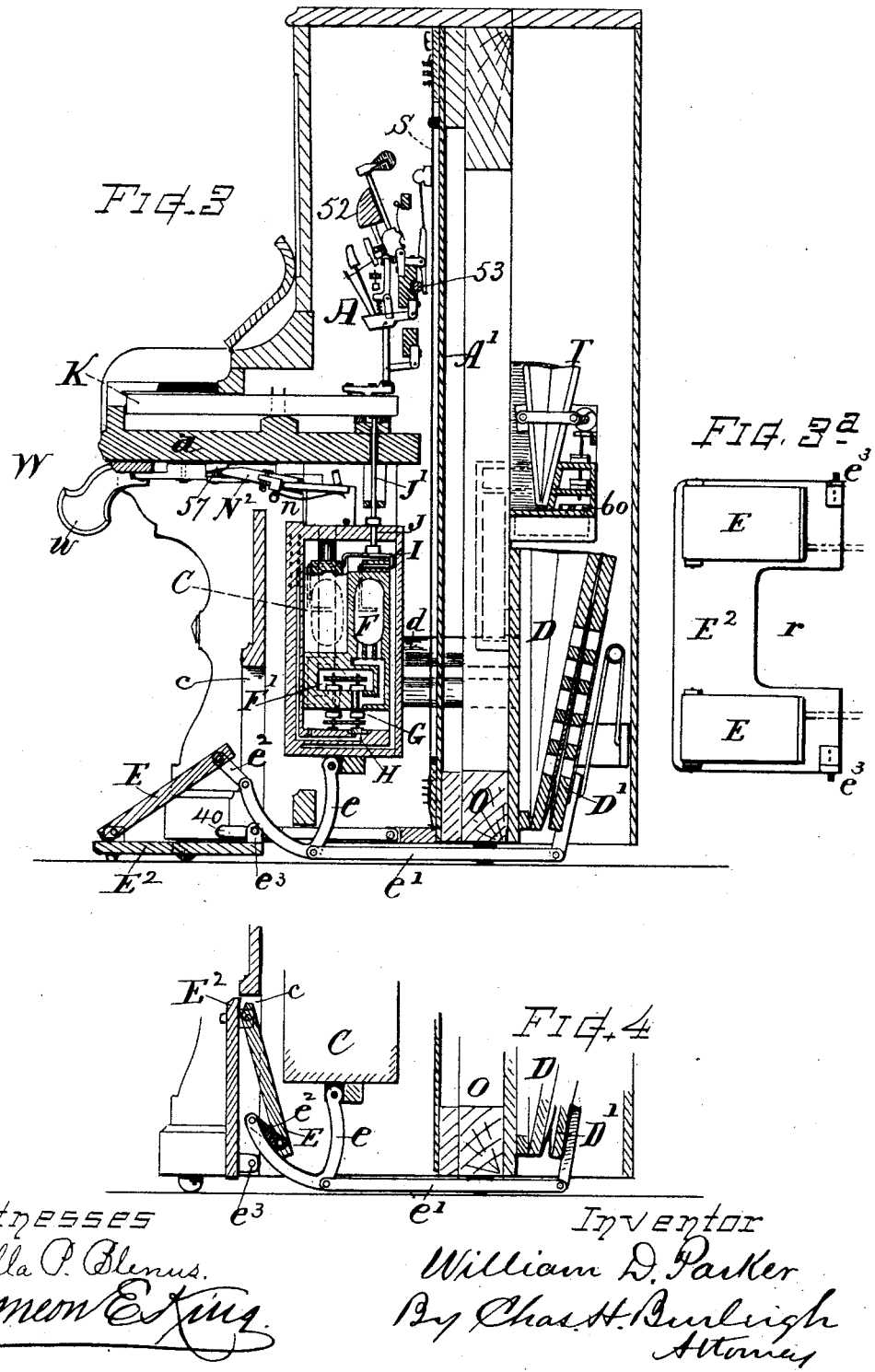

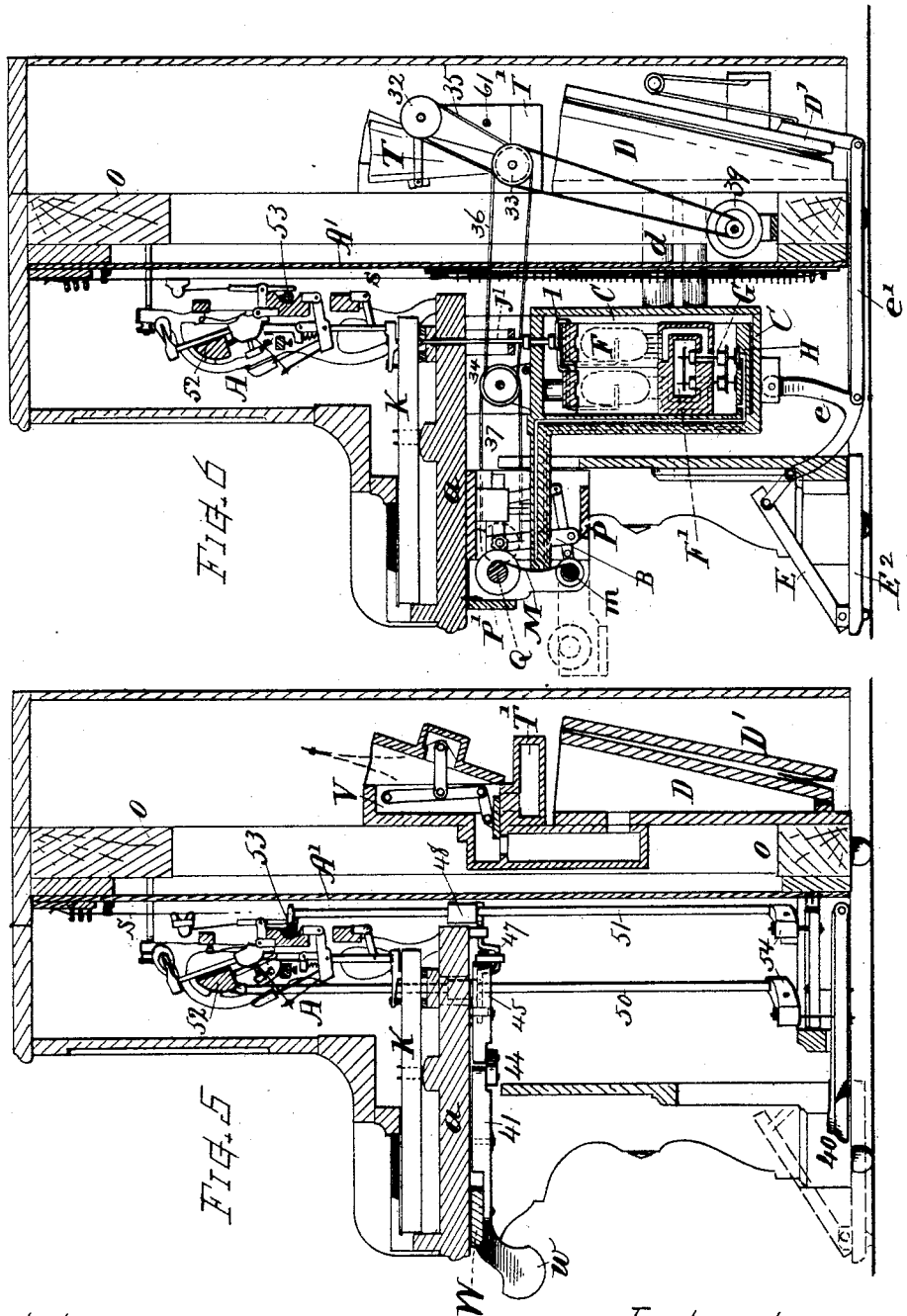

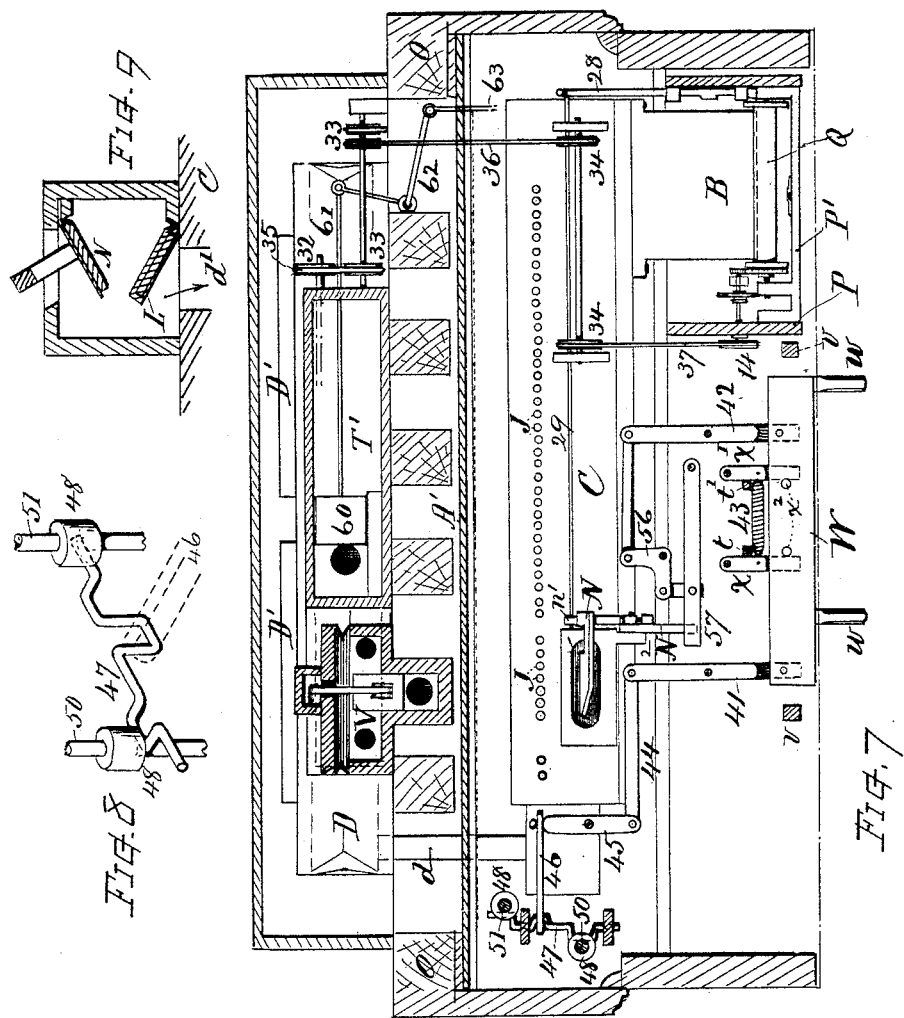

(No Model.) 9 Sheets—Sheet 6.
W. D. PARKER.
AUTOMATIC PIANO.
No. 470,323. Patented Mar. 8, 1892.
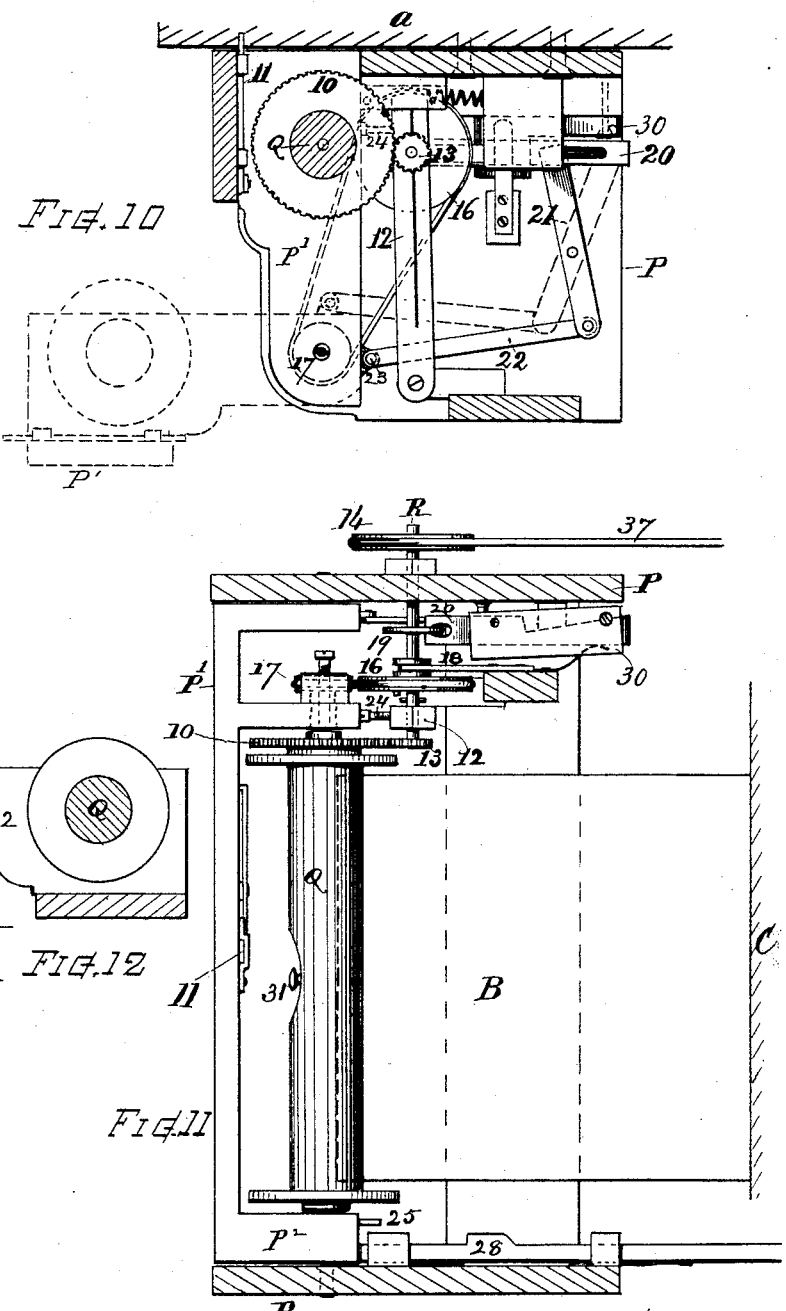
Witnesses
Ella P. Blenus.
Simeon E. King
Inventor
William D. Parker
By Chas. H. Burleigh,
Attorney (No Model.) 9 Sheets—Sheet 7.
W. D. PARKER.
AUTOMATIC PIANO.
No. 470,323. Patented Mar. 8, 1892.
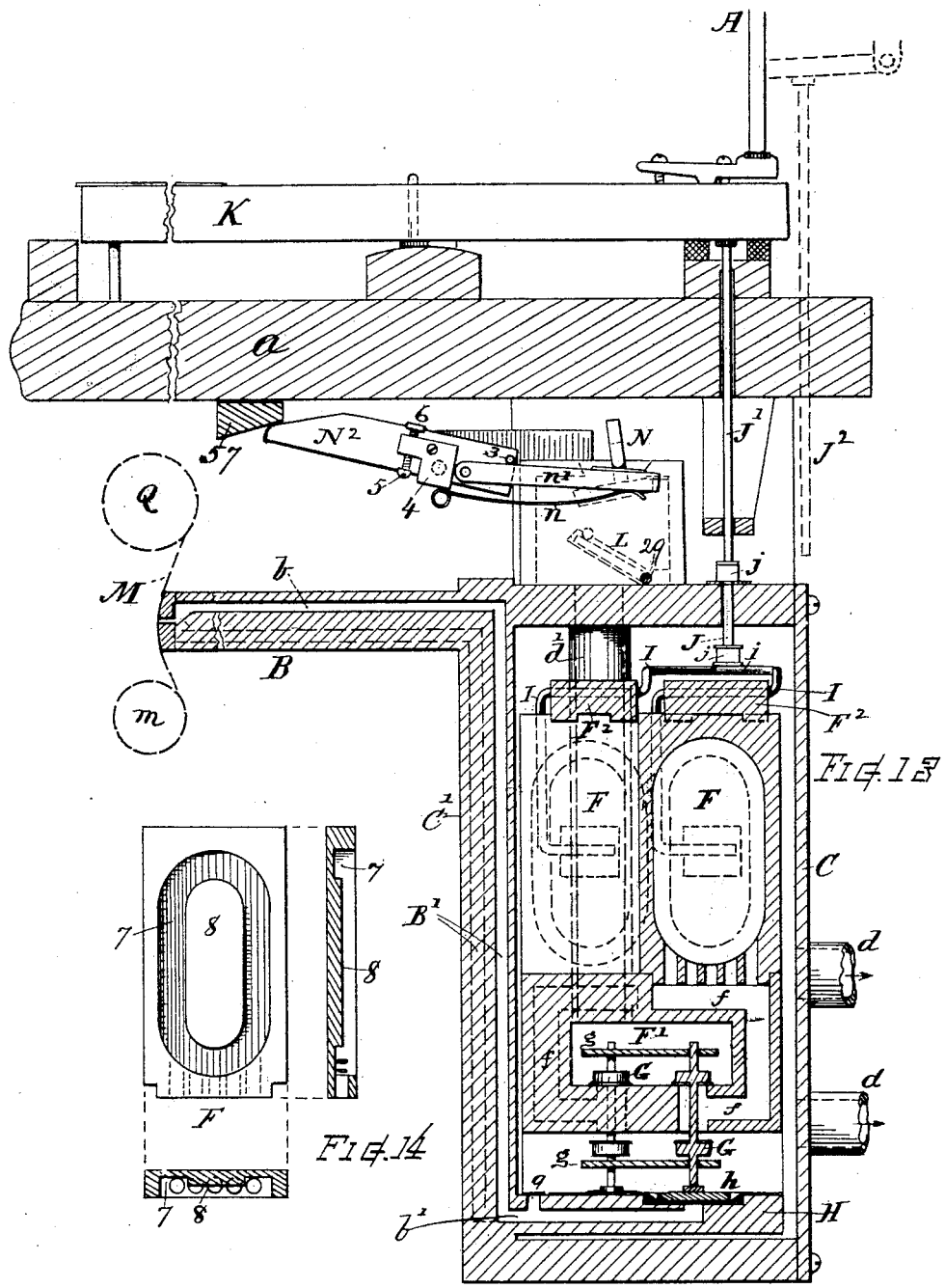
Witnesses
Ella P. Blenus.
Simeon E. Kull
Inventor
William D. Parker
By Chas. H. Burleigh
Attorney (No Model.) 9 Sheets—Sheet 8.

W. D. PARKER.
AUTOMATIC PIANO.

No. 470,323. Patented Mar. 8, 1892.

Witnesses
Ella P. Blenus.
Simeon E. King

Inventor
William D. Parker
By Chas. H. Burleigh
Attorney

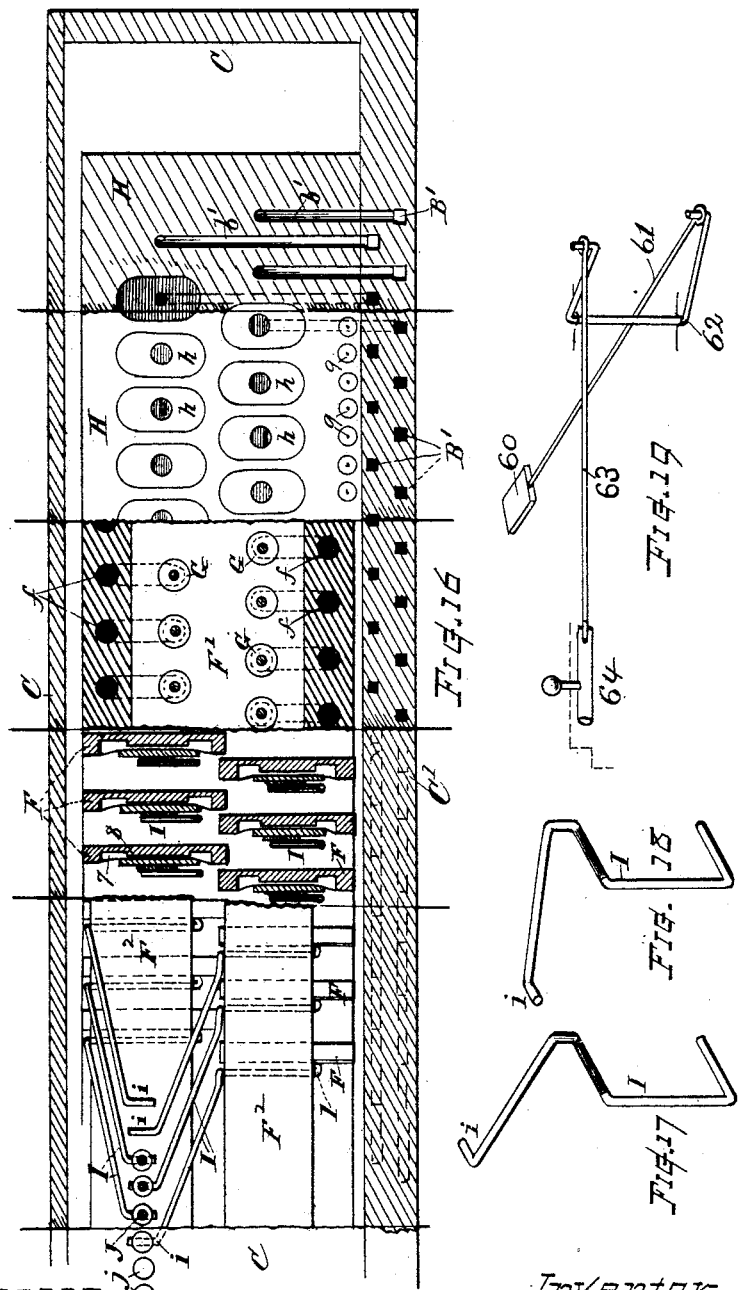

UNITED STATES PATENT OFFICE.

WILLIAM D. PARKER, OF MERIDEN, CONNECTICUT, ASSIGNOR OF THREE-FOURTHS TO EDWARD H. WHITE, OF SAME PLACE.

AUTOMATIC PIANO.

SPECIFICATION forming part of Letters Patent No. 470,323, dated March 8, 1892.

Application filed October 16, 1891. Serial No. 408,857. (No model.)

*To all whom it may concern:*

Be it known that I, WILLIAM D. PARKER, a citizen of the United States, residing at Meriden, in the county of New Haven and State of Connecticut, have invented a new and useful Automatic Piano, of which the following, together with the accompanying drawings, is a specification sufficiently full, clear, and exact to enable persons skilled in the art to which this invention appertains to make and use the same.

The object of the present invention is to provide a desirable and efficient combination-piano adapted for either manual or automatic operation at will, and having a system of pneumatic operating mechanism controlled by a perforated music-sheet, suitable wind-inducing apparatus, a motor, and expression devices, as will be more fully hereinafter explained.

Another object is to provide a pneumatic operating mechanism for pianos that can be permanently introduced into the structure of the instrument for operating upon the rear ends of the manual-keys and which will not interfere with or prevent the use of the piano for the ordinary manual operation or playing of the piano by hand.

Another object is to provide a pneumatic piano-playing mechanism with means for varying the energy or power of the striker-actuating pneumatics, so as to give harder or softer strokes, accordingly as forte or piano expression is to be produced.

Another object is to provide, in connection with the piano-action and pneumatic operating mechanism, an expression mechanism readily controlled by the player for regulating the force of the action and varying the potency of the pneumatics.

Another object is to provide, in connection with the piano-case and pneumatic tracker, practical and efficient means for supporting the perforated music-sheet for winding and rewinding the same and convenient facilities for changing the music-sheet spool when desired.

Another object is to afford means for automatically stopping the pneumatic action during the rewinding of the music-sheet.

Another object is to provide means for regulating the speed of the motor and to provide means for giving quicker or slower action thereof to vary the time of execution.

Another object is to provide a pair of pumping-pedals that can be employed without interfering with the usual piano-pedals and which can be readily folded up out of the way when not desired for use, leaving the piano-pedals exposed for use in their usual position.

These objects I attain by mechanism the nature, organization, and operation of which is herein illustrated and described, the minor objects and distinctive features of the invention being set forth in the following description and the particular subject-matter claimed being hereinafter definitely specified.

Figure 15:
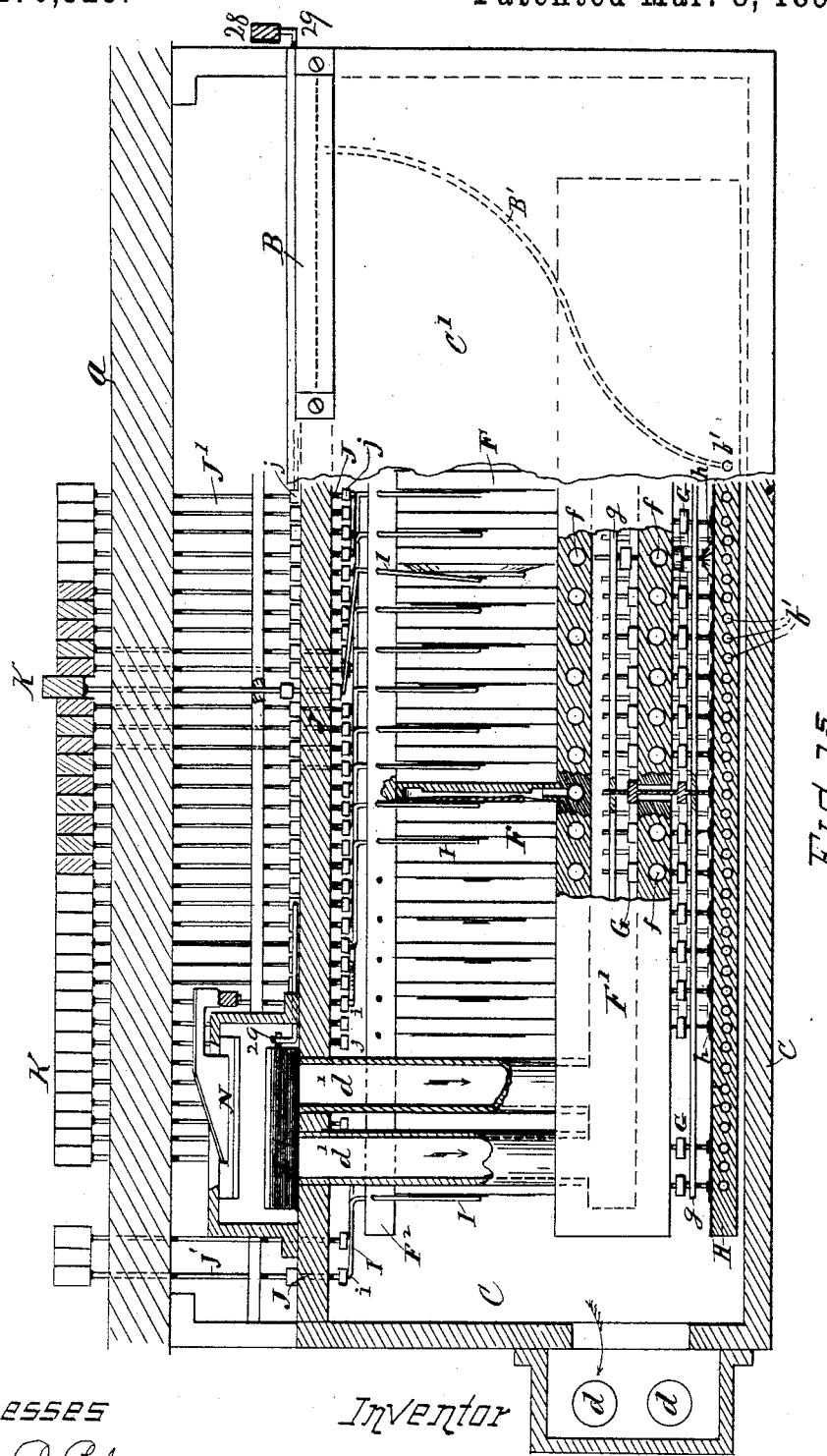

In the drawings, Figure 1 is a front view of an automatic piano embodying my invention. Fig. 2 is a rear view of the same. Fig. 3 is a vertical section through the pedals, wind-inducing apparatus, pneumatic chest, motor, and piano-action. Fig. 3ª is a plan of the blow-pedal and its folding base. Fig. 4 is a sectional view showing the manner in which the pedals are folded when not in use. Fig. 5 is a vertical section showing the arrangement of the expression mechanism in connection with the uprights of the loud and soft pedals. Fig. 6 is a section showing the pneumatic action, tracker, and music-winding apparatus and the arrangement of the bellows motor and driving bands and their relation to the piano-action. Fig. 7 is a horizontal section showing the location of the music-winding apparatus and expression mechanism. Fig. 8 is a detail view of the crank-rod connecting the expression mechanism with the loud and soft pedal-actuated lift-rods. Fig. 9 is a transverse section through the valves that control the air-inlet to the operating-pneumatics. Fig. 10 is a vertical section on somewhat larger scale, showing the music-sheet carrier and winding mechanism. Fig. 11 is a plan view of the same, together with the tracker. Fig. 12 shows in detail the manner of securing the music-sheet spools in the holder. Fig. 13 is a vertical section on larger scale, showing in detail the construction of the pneumatic action, its regulating devices, and key-lifting connections. Fig. 14 shows the form of the body or back plate of the operating-pneumatics. Fig. 15 is a longitudinal section illustrating the arrangement of the pneumatics, the connection therefrom to the manual-keys, and also the regulating and stop valves. Fig. 16 shows horizontal sections through the wind-chest at different levels, illustrating the construction of the operating-pneumatics, actuating-levers, flush-valves, controlling-pneumatics, and air-passages. Figs. 17 and 18 show in perspective the cranked-wire levers for transmitting motion from the operating-pneumatics to the key-lifters; and Fig. 19 illustrates the arrangement of connections for operating the stop-gate of the motor.

In the construction of this improved automatic piano the hammer mechanism, piano-action A, the sound-board A', and strings S, together with their attaching devices and the main supporting-frame O, can all be constructed and combined substantially in the usual well-known manner as heretofore employed in upright pianos. The case can also be of the usual or any suitable form, the front and rear parts thereof being modified to accommodate the mechanism hereinafter described.

The term "piano-action" as used in this specification and the claims is intended to include the group of operating parts above the manual-key for producing the stroke upon the string, effecting recoil of the hammer, and damping the string, comprising the hammer, jack, rocker, back-stops, springs, trip device, martingale, and lift-bar and their connection-joints, such parts being the same as are usually employed in upright pianos, and are thus referred to in a group for abridgment of description.

Within the front part of the case, below the key-table $a$, there is arranged an inclosed pneumatic chamber or wind-chest C, and upon the back of the frame O there is fixed suitable bellows mechanism D, having exhausters or feeders D', operated by pedals E, hinged sectors or angle-levers $e$, and connecting-rods $e'$, as indicated. The bellows are connected for exhausting air from the wind-chest C by suitable tubes or passages $d$, that extend through the sound-board at any convenient position.

The pneumatic action within the wind-chest C is preferably constructed as illustrated in detail in Figs. 13 to 18, inclusive. It consists of a series of upright pneumatics F, arranged in two alternating rows, their lower ends supported in connection with a leader F', having a series of passages or windways $f$, that extend into the respective pneumatics, and with valve-seat passages that open upward into the interior of the leader and downward into the exhaust air-chamber within the wind-chest. Said passages or openings are controlled by puppet-valves G, comprising two disks supported on a spindle at such distance apart that when the valve-puppet is elevated the lower passage will be closed, when the passage to the leader is opened, and vice versa. The series of valve-spindles are guided and the valves maintained central with the openings by means of perforated plates $g$ above and below the valves, through which the valve-spindles pass. Beneath this leader F' is arranged a pneumatic bed H, containing a series of primary or controlling pneumatics $h$, which are respectively located beneath the valve-puppet spindles, so that when any one of the respective pneumatics is flushed or exploded the valve above it will open the passage to the corresponding key-operating pneumatic F into the interior of the leader and close the passage to the exhaust-chamber, and when the controlling-pneumatic $h$ is collapsed the valve-puppet will drop and close the passage from the leader and open the passage into the chamber.

The tracker B, containing the series of orifices over which the music-sheet is advanced, is made of well-known form and is disposed to project forward from the wind-chest, as indicated. The front board C' of the wind-chest is made with a series of channels or windways B', (one of which is indicated by dotted lines, Fig. 15,) which connect the respective tracker-ducts $b$ with the passages $b'$ in the pneumatic bed leading into the controlling-pneumatics $h$, so that each orifice in the tracker controls one of said pneumatics and thereby the flush-valves G, that govern the action of the corresponding main operating-pneumatic.

The upper ends of the operating-pneumatics F are fixed in support-bars $F^2$, upon which are journaled a series of cranked-wire levers I, corresponding with the several pneumatics. (See Figs. 13, 16, 17, and 18.) One end of said wires extends downward and is bent laterally to rest against a felt bearing-pad on the movable plate of the pneumatic, while its upper end is extended horizontally and laterally offset above the fulcrum-supporting bar, so that the end $i$ thereof will rise and fall with the inflation and collapse of the pneumatic F for operating the key-lifter. The pneumatics are best disposed in two rows, alternating, as shown, and the wire levers of the different rows are inclined forward or backward horizontally, as required, to bring their offset ends all into line with each other, thus giving a single row of lifters. The lifters preferably consist of a series of vertically-moving puppets or studs J, arranged in a row above the ends $i$ of the pneumatic levers, and which studs pass through the top of the wind-chest, and are each fitted with a head or disk $j$ at each end that serves to stop the opening around the stud when the lifter is elevated or depressed. Directly over and resting on the lifter-stud J and extending upward beneath the rear end of the manual-key K is a tracker-pin or lifter-pitman J' for transmitting movement from the pneumatic-action to the piano-action. The lifter-pitmen work through suitable guides and openings in the key-table, and are disposed preferably at such position in relation to the piano-action that when the manual-key K is removed the lifter-pin J' can be removed or drawn up from its opening just in front of the hammer jack-lifter and without disturbing the latter. In lieu of disposing the lifters so that they act against the manual-keys, said lifters can, if in any case desired, be arranged to act against the swing-piece or jack-lifter of the piano-action, (see dotted lines J$^e$, Fig. 13,) in which latter case the wind-chest would stand farther back and the key would not be moved when the action was played by the pneumatics.

The air within the wind-chest is exhausted through the passages $d$, and the air within the leader F' for flushing the operating-pneumatics enters through a passage or passages $d'$, the mouth of which is covered by a mute or stop valve L, and over said valve is arranged a chamber or box, (see Figs. 9, 13, and 15,) the entrance-inlet to which is controlled by a regulating-valve N, that closes in opposite direction to the flow of air. Said regulating-valve is combined with a lever $n'$ and spring $n$, that normally tend to close the valve. The pressure of the spring, however, is made such that the exhaust action within the wind-chamber will overcome its tension and suck more or less air through the valve-passage. This lever-and-spring mechanism is shown in Fig. 13. The lever $n'$ is pivoted to a tilting bar or lever N$^2$, which is provided with a stop-pin 3 to prevent the spring $n$ pressing the lever upward beyond a given position, and said spring $n$ is fastened to an adjustable block or carrier 4, pivoted on bar N$^2$ and provided with a set-screw 5, that rests against a lug 6 on said tilting block, and by means of which the tension of the spring can be adjusted to cause the valve to give greater or less resistance against the air-pressure. The tilting bar N$^2$ is fulcrumed upon a suitable support and its outer end is in conjunction with the beveled part of the expression mechanism, as will be hereinafter explained. When the forward end of the tilting bar is depressed, the spring $n$ is caused to give greater pressure for closing the valve N, thereby retarding or in a measure cutting off the wind from entering the leader, and by reduction of supply causing the inflation of the pneumatics to be effected with a less degree of energy, and vice versa when the pressure for closing the valve is reduced.

The operating-pneumatics are best made in large oval form with their body-block having a depression or channel 7 surrounding a central raised portion 8, (see Figs. 14 and 16,) so that the current of air when inflating the pneumatic will enter beneath the movable diaphragm without hinderance, thereby working the diaphragm, actuating-levers, and key-lifters with quick and powerful action. The controlling-pneumatics $h$ are also made of an oval form and disposed in their bed alternately, as illustrated in Figs. 13 and 16. Pin-hole vents 9 are provided for collapsing said pneumatics in the usual manner when the tracker-orifices are closed by the music-sheet.

A frame or carrier P for supporting the music-sheet is attached to and arranged beneath the key-table $a$ at the front of the instrument. Said frame is provided with a forwardly and downwardly swinging spool-holder P', in the upper part of which is journaled the winding-roll Q, while the lower part is provided with bearings for the music-sheet spool $m$. The hinging of said swinging portion is preferably axially in line with the spool-bearings. A suitable latch 11 is provided upon the front swinging portion, whereby it is retained when in raised position. This carrier and winding apparatus is shown in detail in Figs. 10, 11, and 12.

An operating-shaft R is supported in a swinging bearing 12 within the upper part of the frame and provided with a pinion 13 on its inner end that meshes with a gear 10 on the winding-roll Q and at its other end with a pulley 14, on which the driving-belt runs. Said shaft is also provided with a clutch-pulley 16, from which a belt extends to a pulley fixed on the rewinding-coupling 17, to which the journal of the music-sheet spool $m$ is coupled by means of the well-known slotted socket and flatted journal. The hub of the clutch-pulley is retained in position by a guard 18, which engages a groove thereon, and the shaft is provided with a flange 19, that engages a swinging lever 20, operated by the inclined end of a lever 21, fulcrumed on the frame and having its lower end coupled by the link 22 to the swinging spool-holder P, as indicated at 23 in Fig. 10.

The shaft-bearing 12 is provided with an adjusting-screw 24, against which the swinging spool-holder strikes and rests when the latter is in elevated position, thereby sustaining the bearing to a position where the pinion 13 will properly mesh with the gear 10 of the winding-roll.

The tracker B extends forward within the carrier-frame to a position between the music-sheet spool $m$ and winding-roll Q, so that the music-sheet M when in operation is drawn over the end of the tracker in the manner indicated in Figs. 6 and 13. For retaining the music-sheet spool in the holder the outer end piece P$^2$ of said swinging holder is provided with a cut-away portion 26, which will permit of the spool-journal $m'$ dropping to a central position, (see Fig. 12,) and a spring-pressed latch 25, arranged therein, swings over the spool-journal $m'$ and retains it within the bearing. For releasing the spool said latch can be pressed back by the thumb. The spool-holder is let down to the position shown by dotted lines, Fig. 10, for inserting and taking out the music-sheet spool and then rewinding. The action of letting down the holder automatically effects, through the connection, the shifting of the clutch for throwing the rewinding-pulley 16 into connection with the operating-shaft R, and the rewinding of the music-sheet onto the spool $m$ is automatically effected by the operating shaft and motor. A bar 28 is arranged in connection with the music-carrier and the rocker-rod 29, which works the stop-valve L, closing over the passage into the flushing-leader F' of the operating-pneumatic F, so that when the spool-holder P' is swung down said valve L will close for totally stopping the action of the pneumatics, as no air can then enter the leader, and when the spool-holder is raised into upright position said stop-valve will be automatically opened by the spool-holder coming in contact with and pressing back said slide-bar 28 and action of the same against the rocker-rod 29, which lifts the valve. The lever 20, which effects the movement of the shaft for throwing it into and out of gear, is attached to a swinging fulcrum-block 30, and is held to position by suitable springs, so that any excess of movement will not injuriously affect any part of the mechanism. In setting the music-sheet spool its flatted bearing is inserted in the slotted coupling-journal 17 and its opposite end is dropped into the cut-away space 26 at the opposite side. The loop on the end of the music-sheet is then hooked onto the stud 31 of the winding-roll Q, connecting the sheet thereto in well-known manner.

For generating motion to operate the music-winding mechanism a pneumatic engine or motor T is employed, which can be constructed substantially as described in Letters Patent No. 355,201, heretofore granted me. Said motor is best supported upon the back of the piano-frame, and from the pulley 32 on the motor-shaft power is transmitted to the operating-shaft of the music-carrier by a series of pulleys 33 and 34, mounted on suitable shafts and bands 35, 36, and 37, connecting the same, as illustrated in Figs. 6 and 7. A quick-running balance-wheel 39, driven by a band from a pulley on the first intermediate shaft, is provided for giving a steady and uniform motion to the driving mechanism.

The motor T is operated by exhaust action of the bellows D, to which the wind-chest T' of the motor is connected by passages that have combined therewith a regulating mechanism V for giving a uniform pressure of air for running the motor. The structure of such regulator forms the subject-matter of an application for separate Letters Patent, and is not therefore herein particularly described. The blow-pedals E are fulcrumed upon a base-board $E^2$, which is hinged to the front of the case, as at $e^3$, and adapted to fold or swing upward into an opening $c$, formed in the front for its reception, or to swing downward to a horizontal position, as shown in Figs. 3 and 4. The swinging end of the pedal is connected by a link $e^2$ to the forward arm of the sector-shaped lever $e$, the other arm of which is fulcrumed to a suitable support beneath the wind-chest, while the heel of the lever is connected by the rod $e'$ for working the exhauster D' of the bellows in opposition to the exhauster-closing springs. (See Figs. 3, 4, and 6.) When the blow-pedals are not required for use, the pedal-base and pedals are swung up into vertical position, as in Fig. 4. The base-board has an open central space $r$ to afford access to the piano-pedals 40.

For producing or controlling the expression I employ a mechanism which preferably consists of an endwise-movable plate or bar W, having knee-pads $w$ fixed thereto, combined with series of levers and connections arranged beneath the key-bed $a$. (See Figs. 1, 3, 5, and 7.) The bar W is supported by the two levers 41 and 42, which are centrally fulcrumed upon the under side of the key-table and have their front ends pivotally connected with said bar. Two swinging levers $x$ $x'$, fulcrumed at their rear ends to the key-table at some distance apart, extend under said bar W and engage against studs or lugs $x^2$, fixed therein. These two levers are connected to each other by a spring 43, that normally tends to draw the levers together and against the studs $x^2$. Stop-pins $t$ $t'$, fixed in the key-table, prevent the lever $x$ from swinging toward the right and the lever $x'$ from swinging toward the left. Consequently the bar W is, by the spring and levers, maintained at a central position and when pressed, whether to the right or left, by the knee is again returned to central position by the action of the spring when the pressure is removed. Stops $v$ are provided at proper distances from the ends of the bar for limiting its movement in either direction. The rear end of the lever 41 is connected by a link 44 to a second swinging lever 45, fulcrumed on the key-table, which latter has its rear end joined by a connection 46 to a cranked-wire rocker 47, that is supported in suitable bearings and provided with crank-arms that respectively engage collars 48, fixed on the pitmen or lift-rods 50 and 51, that operate the hammer-rest rail 52 and damper-retractor 53 of the piano-action A, the said pitmen being the same ordinarily employed in connection with piano-pedals and worked from said pedals by levers 54 in the usual well-known manner. The hammer-rest rail and damper-retractor can thus be operated for softening or increasing the tone, either by the piano-pedals 40 or expression-bar and its mechanism operated by the knee. The construction of the damper-retractor and hammer-rest rail is the same as employed in the ordinary piano-action. The arrangement of the crank-arms on the rock-shaft 47 are such that movement of the bar in one direction will lift the pedal-pitman 50 for softening the hammer-strokes, while movement of the expression-bar in the opposite direction will operate the pedal-pitman 51 for retracting the dampers from the strings S. The rear end of the lever 42 is connected by suitable links and intermediate angle-lever 56 with a swinging bar or movable piece 57, having an incline surface that engages with and depresses the regulator-lever $N^2$, whereby the resistance of the inlet-controlling valve N of the pneumatic leader F' is varied. Hence when the expression-bar W is moved by pressure of the knee for effecting action equivalent to that of the soft-pedal of the piano, by working the lift-rod 50 to raise the hammer-rail the tilting of the lever $N^2$ increases the power of the spring $n$ for more closely closing the valve N, and the supply of air for flushing the operating-pneumatics F is automatically, simultaneously with the lifting of the hammer-rest rail, reduced or partially cut off, thereby decreasing the energy of the pneumatics F, so that they will give a lighter stroke. When the expression-bar W is moved in the opposite direction for giving action equivalent to the loud pedal, by lifting the rod 51 for retraction of the dampers from the strings the inclined piece 57 is moved from the regulator-lever $N^2$, decreasing the pressure of the spring against the valve and allowing a more free inlet of air for flushing the pneumatics, thereby increasing their energy for giving quick and powerful strokes. This regulation of the pneumatic energy by variation of the air-supply for the inflation of the pneumatics simultaneously with the production of the forte and piano expression in the hammer and damper mechanism is an important feature of my invention.

It will be observed that the expression mechanism operated by the bar W in no way interferes with the operation of the expression devices of the piano operated by the piano-pedals, and, also, that the music-support, blowing-pedals and bellows apparatus, and the pneumatic playing mechanism in no way interferes with the playing of the instrument by the manual. Hence my invention produces a very desirable compact instrument, which can at pleasure be operated either automatically or manually, or, providing a player is sufficiently expert, both automatically and manually at the same time.

For effecting variation in time or giving the music-sheet slow or fast movement the speed of the motor is regulated by means of a gate or cut-off valve 60. This valve is attached to a rod 61, which extends to the exterior of the motor-case T and connects with the arm of an angle-lever or cranked wire 62, the other arm of which is connected by a wire or link 63 with a slide 64, fitted to move back and forth in the key-block at the end of the manual, and having a knob that projects through a slot and above said key-block. By moving the knob backward or forward the speed of the motor can be varied, and the time in which the music-sheet passes over the tracker can be regulated, as may be desired, for any music.

The general arrangement of the connection for operating the motor-gate is illustrated separately in Fig. 19. (Also see Figs. 2 and 7.)

The operation of my automatic piano is as follows: The front of the music-carrier or spool-holder is swung down, the spool containing a perforated music-sheet is adjusted in position thereon, and the loop at the end of the sheet hooked onto the stud of the winding-roll. The spool-holder is then swung up to upright position and secured by its latch. This brings the music-sheet across the face of the tracker, so that its perforations will pass over the tracker-ducts as the sheet is advanced toward the winding-roll. The operator then by simply working the pedals E induces wind-currents in the motor and pneumatic chambers by the exhaust action of the bellows. The motor-gate being opened, revolution of the motor-shaft is effected and the motion is transmitted through the driving belts and pulleys to the operating-shaft R and by its pinion to the winding-roll Q. As a perforation of the sheet is brought into position over a tracker-duct air is admitted which flushes the primary controlling-pneumatic $h$. This lifts the valve-puppet G and opens the windway $f$ into the leader F' and closes the passage into the exhaust-chamber, thereby allowing air to rush in and instantly explode or inflate the large operating-pneumatic F, the action of which swings the cranked wire I, causing its end $i$ to be thrown upward, raising the lifter-pitman against the under side of the key and forcing the key upward, thereby operating the jack-lifter and rocker and causing the jack to throw the hammer against the string in the same manner as though the front end of the key were manually depressed by the finger. Thus as the various perforations are brought into line with the different tracker-ducts the corresponding pneumatics are rendered active and the various notes are sounded in accordance with the indications of the music-sheet, as will be readily understood from the foregoing description. The expression as the playing proceeds is varied by movement of the knees pressing the bar W to the right or left, accordingly as loud or soft passages are desired. The pneumatics F respond with a quick and powerful stroke, the energy of which is varied by the expression mechanism, so that a very brilliant, perfect, and expressive execution of the same is effected. When the music-sheet has been run through, the spool-holder of the music-carrier is unlatched and swung down. This operation automatically effects the closing of the valve N, which stops admission of air to the pneumatic flushing leader and also throws the rewinding pulley 16 into clutch with the operating-shaft R, and by the continued operation of the motor power and motion are transmitted to the spool and the music-sheet is quickly rewound thereon. Then by pressing back the catch-lever 25 the music-sheet spool can be removed from the holder and replaced by another.

I claim as my invention herein, to be secured by Letters Patent—

1. The combination, with a piano-action and manual-keys, of the wind-chest disposed below the key-table and containing within its interior the pneumatic action having lifters at the top of said wind-chest, and the series of upright detached pitman-pins arranged through holes in said key-table beneath the rear ends of the respective keys, the lower ends of said pitman-pins being adjacent to the top of said wind-chest in position to be engaged by said lifters when worked by the respective pneumatics, substantially as and for the purpose set forth.

2. The combination, with the piano-action and manual-keys, of the wind-chest, the series of key-operating pneumatics inclosed within said wind-chest and provided with lever connections and lifters for moving the manual-keys and piano-action, the air-inlet leader having passages with valves that control the flow of air into and from said operating-pneumatics, the bed of primary pneumatics within said wind-chest that operate said valves, the tracker with air-ducts leading to said primary pneumatics, and the perforated music-sheet controlling said tracker-ducts, substantially as and for the purpose set forth.

3. The combination, substantially as described, with the piano-action and sounding-strings, of the wind-chest disposed in rear of the front board beneath the key-table and containing the series of collapsible and inflatable pneumatics inclosed within said chest, means for transmitting motion therefrom to said piano-action, the bellows or wind-inducing apparatus supported at the back of the frame, with connections for exhausting air from said wind-chest, the pumping-pedals adjacent to the piano-pedals, with connections for working the bellows-exhausters, and the tracker and traveling music-sheet for controlling the pneumatic action, as set forth.

4. The combination, with the piano-action and manual-keys, of the wind-chest disposed beneath the key-table and having the series of lifter-puppets through the top thereof, the pitman-pins extending therefrom to the keys, the rocker-levers from the pneumatics to said lifter-puppets, the operating-pneumatics inclosed within said wind-chest, in connection with the air-inlet leader having air-passages that open into said air-inlet leader and also into the interior of the wind-chest, the double-valved puppets controlling said passages, the primary pneumatics beneath said valve-puppets, the tracker attached to said wind-chest front, with air-ducts leading to said primary pneumatics, the perforated music-sheet controlling said ducts, and the exhaust-bellows having air-tubes that connect with said wind-chest, all substantially as and for the purpose set forth.

5. The operating-pneumatic, its body provided at the back of its chamber with a channel or depression in communication with the inlet-orifice, and a centrally-raised surface against which its diaphragm is collapsed, in combination with the wind-chest, air-inlet leader, controlling-valves, piano-action, and key-lifting devices, for the purpose set forth.

6. The hinged pedal-base provided with the blower-pedals mounted thereon and having a central open space, as described, in combination with the piano-pedals and the piano-front having a recess into which said blower-pedals and hinged base are folded when not required for use, substantially as shown and described.

7. The pedal-base hinged to swing upward or fold at the front of the case, the blow-pedals fulcrumed thereon, the sector-shaped levers having their rear arms fulcrumed on the frame, their front arms connected to the pedal by a pivotally-attached link in a manner adapting the pedal to swing into the V-shaped space between the lever-arms, in combination with the connecting-rod joining the heel of said lever with the exhauster, the piano-front, piano-pedals, and bellows-exhausters, substantially as described.

8. The combination, with the piano-action, key-actuating lifters, operating-pneumatics, pneumatic chest with wind-inducing apparatus for exhausting the air therefrom, and the inlet-passages through which air is supplied for inflating said pneumatics, of a regulating-valve disposed in said inlet-passages and closing in opposition to the entering air-current, and a spring for pressing said valve toward its seat with a force less than the exhaust-pressure exerted by the wind-inducing apparatus, substantially as and for the purpose set forth.

9. The combination, with the piano-action, manual-keys, key-lifters, operating-pneumatics, exhaust wind-chest containing said pneumatics, and the inlet-passage for admitting air for flushing said pneumatics, of the regulating-valve for said inlet, having a closing-spring attached to a yielding lever and a movable inclined bar engaging said lever for depressing the end thereof to vary the spring-pressure against the valve, connections for moving said inclined bar onto and from the said yielding lever, and an expression bar or stop at the front of the instrument, whereby said connections and inclined bar are operated, substantially as and for the purpose set forth.

10. The combination, with the spring-pressed regulating-valve that controls the air-inlet to the operating-pneumatics and the tilting lever for varying the spring-pressure, of the spring-supporting head 4, pivotally attached to said lever, the adjusting-screw 5, arranged therein, and lug 6, fixed on said lever, substantially as and for the purpose set forth.

11. The combination, with the piano-action, the manual-key table, and the pneumatic action having the projecting tracker extending forward beneath the key-table, of a music-sheet carrier supported beneath said key-table and having the music-spool, music-winding roll, and roll-operating mechanism mounted therein, substantially as set forth.

12. The music-sheet carrier supported beneath the key-table and having a forwardly and downwardly swinging spool-holder in which the winding-roll and music-sheet spool are journaled, and a latch or means for retaining said spool-holder in upright position, in combination with the piano key-table beneath which said carrier is supported, and the tracker, the pneumatic action having its orificed end disposed at a position where the music-sheet is moved from and against the same by the swinging of said spool-holder, as set forth.

13. The combination, substantially as described, of the swinging spool-holder provided with the rewinding-coupling 17 and the winding-roll Q, provided with a gear 10, the operating-shaft R, provided with a pinion 13, that normally engages said gear, a clutch-pulley 16 on said shaft, connected by a band with said rewinding-coupling normally out of engagement, and a series of connections and levers actuated from said swinging spool-holder for automatically shifting the clutch, as set forth, whereby the winding devices are rendered operative when the spool-holder is in normal position and the rewinding devices are rendered operative when the spool-holder is swung down.

14. In combination with the winding-roll, its gears 10, and the swinging holder or winding-roll support, the operating-shaft carrying the pinion 13, that meshes with said gear, of the movable spring-pressed bearing 12, in which said shaft is journaled, and the adjusting-screw 24, fitted to said bearing and projecting to engage or rest against said swinging support, substantially as and for the purpose set forth.

15. The combination, substantially as described, with the swinging spool-holder and the inlet-passage through which air is admitted for flushing the key-operating pneumatics, of a stop-valve, as L, for closing said passage, a rocker-shaft or connection for lifting or opening said valve, and a movable bar the respective ends of which act in conjunction with said spool-holder and rocker-shaft to automatically raise said stop-valve when the spool-holder is raised to normal position and to permit said valve to close when said spool-holder is swung down, for the purpose set forth.

16. The swinging spool-holder provided with the recess 26 and a bearing $m'$ for the reception of the music-sheet-spool journal, and the spring-pressed journal-catch 25, in combination with the music-sheet carrier, winding-roll, pneumatic tracker, rewinding-coupling, and roll-operating mechanism, substantially as set forth.

17. In combination with the upright piano-action, its sound-board, strings, and manual-keys, the operating-pneumatics, key-lifters, controlling-pneumatics, valves, tracker, music-sheet winding-roll, roll-operating gearing disposed forward of the sound-board and string plane, and the exhaust-bellows and pneumatic motor disposed at the rear of the said board or frame, with a driving-belt passing through the sound-board on the string plane to the roll-operating mechanism, and blow-pedal connections extending under the frame, substantially as set forth.

18. The combination, with the piano-action, pneumatic mechanism for playing the same, wind-inducing bellows, and the pneumatic motor that generates power for moving the music-sheet rolls, of the gate or valve 60 for stopping off said motor, the slide 64, fitted in the key-block with its hand-knob projecting above the same, the connecting-rod 63, cranked lever 62, and valve-rod 61, substantially as set forth.

19. The combination, with the piano-action and the pedal-pitmen or lift-rods that operate the hammer-rest rail and damper-retractor, of an expression-bar having knee pads or pressers disposed below the key-table, and connections from said expression-bar for lifting or working said pitmen, substantially as set forth.

20. The combination of the piano-action, the upright pitmen or lifters controlling the hammer-rest rail and damper-retractor, provided with collars 48, fixed thereon, base-levers 54, pedals 40 for working said levers by the foot, the expression-bar having knee-pressers $w$, the swing-levers 41 and 45, fulcrumed beneath the key-table, the oppositely-cranked rock-shaft 47, engaging said pitman-collars, and the connecting-links 44 and 46, joining said levers and cranked rock-shaft, substantially as and for the purposes set forth.

21. As a means for producing or controlling expression in automatic pianos actuated by pneumatic operating devices, an adjustable resistance-valve, in combination with the air-supply passage leading to the pneumatics, and an adjustable yielding connection or presser that acts in opposition to the incoming air-current, said valve being thereby adapted for varying the tension or amount of air supplied for inflating the operating-pneumatics while the exhaust force within the pneumatic chest is normally maintained, substantially as hereinbefore set forth.

22. In an automatic piano having a movable hammer-rest rail and retractable dampers, and a pneumatically-actuated key-operating mechanism, the combination, with the lifter that moves the hammer-rest rail and the air-supply passage to the pneumatic in the key-operating mechanism, of a resistance-valve in said air-supply passage and an expression-slide having connections therefrom for working said hammer-rest rail, and connections for actuating said resistance-valve, whereby expression is produced or controlled by the reduction of the distance of hammer-strokes and weakening the energy of the pneumatic operators simultaneously, substantially as set forth.

23. The combination, with the piano-action, the keys, and key-operating lifters, of the pneumatics F, attached to the air-inlet leader and disposed within the wind-chest in alternating order in separate upright rows supported by the bars $F^2$, and the cranked-wire levers I, having their fulcrums disposed laterally on said bars and their upper horizontal arms inclined laterally, one set forward and the other set backward, with their ends $i$ in line under the lifters, as shown and described.

24. The combination, with the expression-bar having the knee-pressers and the connections therefrom for operating the expression devices in the piano-action, and the pneumatic regulator, of the horizontally-swinging levers $x\ x'$, fulcrumed to the key-table and engaging against studs $x^2$ in said expression-bar, the springs 43, connecting said levers, and the stop-pins $t\ t'$, fixed in the key-table, substantially as and for the purpose set forth.

25. The combination of the piano-action, pneumatic key-operating devices, and lifters engaging the keys beneath the action, a traveling perforated music-sheet controlling the tracker-ducts of the pneumatic action, and a pneumatic motor with pulleys and belts for driving the music-sheet winding-roll, and the isolated balance-wheel 39, connected by belt with an operating-shaft intermediate between the motor and sheet-winding roll, as and for the purpose set forth.

26. The lifter-puppets J, provided with a head or disk $j$ at each of its ends, in combination with the wind-chest top, the levers I, their operating-pneumatics, the lifter-pitmen J', and piano-keys K, substantially as and for the purpose set forth.

Witness my hand this 12th day of October, A. D. 1891.

WM. D. PARKER.

Witnesses:
E. H. WHITE,
J. H. WHITE.